(12) United States Patent  
Matsuda

(10) Patent No.: US 7,062,332 B2  
(45) Date of Patent: Jun. 13, 2006

(54) CONTROLLER TO BE CONNECTED TO A NETWORK VIA AN IEEE 1394 SERIAL BUS

(75) Inventor: Masahiro Matsuda, Daito (JP)

(73) Assignee: Funai Electric Co., Ltd., Daito (JP)

(*) Notice: Subject to any disclaimer, the term of this patent is extended or adjusted under 35 U.S.C. 154(b) by 92 days.

(21) Appl. No.: 10/936,807

(22) Filed: Sep. 9, 2004

(65) Prior Publication Data

US 2005/0097112 A1    May 5, 2005

(30) Foreign Application Priority Data

Sep. 9, 2003    (JP)    ............................. 2003-317346

(51) Int. Cl.
*G05B 11/01*    (2006.01)

(52) U.S. Cl. .............................. 700/19; 700/1; 700/20; 700/17; 700/83; 703/20; 703/21; 710/100; 710/104; 711/1; 711/100; 714/763; 714/769

(58) Field of Classification Search ............ 700/17–19, 700/20, 83, 93; 710/100, 104, 111; 703/20, 703/21; 714/763, 769; 711/1, 100
See application file for complete search history.

(56) References Cited

U.S. PATENT DOCUMENTS

| | | | | |
|---|---|---|---|---|
| 6,032,211 | A * | 2/2000 | Hewitt | 710/107 |
| 6,421,751 | B1 * | 7/2002 | Gulick | 710/107 |
| 6,831,603 | B1 * | 12/2004 | Menache | 342/463 |
| 6,940,831 | B1 * | 9/2005 | Omi et al. | 370/310.1 |
| 2002/0042041 | A1 * | 4/2002 | Owens et al. | 434/322 |

FOREIGN PATENT DOCUMENTS

| | | |
|---|---|---|
| JP | 2002-016620 | 1/2002 |
| JP | 2003-018161 | 1/2003 |

* cited by examiner

*Primary Examiner*—Ramesh Patel  
(74) *Attorney, Agent, or Firm*—Crowell & Moring LLP

(57) ABSTRACT

If it becomes necessary to add, to a past device information list (past list), a record of device information of a target removed from a network, and if the number of records in the past list is already at its maximum so that it is impossible to store any more records in the past list, a microprocessor of a controller decides the priority of the removed target, based on device information of the removed target and on information of the kind of controller as stored in a configuration ROM in the controller. From records stored in the past list, the microprocessor searches for a record having a priority lower than the priority of the removed target, one by one in order from the first record therein. If the microprocessor finds a record having such a lower priority, the microprocessor deletes from the past list such record having been first found, and adds to the past list a record of the device information regarding the removed target. If the microprocessor fails to find such a record, the microprocessor searches for a record, which has the same priority as the priority of the removed target, from the records in the past list one by one in order from the first record therein. The microprocessor deletes from the past list such a record as having been first found, and adds to the past list a record of the device information regarding the removed target.

4 Claims, 12 Drawing Sheets

CURRENT POINTER LIST 31

CURRENT POINTER LIST 31

|  | POINTER TO PREVIOUS RECORD | POINTER TO RECORD IN CURRENT LIST X | POINTER TO NEXT RECORD |
|---|---|---|---|
| ✻data0 | ✻data6 | ✻A | ✻data1 |
| ✻data1 | ✻data0 | ✻B | ✻data2 |
| ✻data2 | ✻data1 | ✻C | ✻data3 |
| ✻data3 | ✻data2 | ✻D | ✻data4 |
| ✻data4 | ✻data3 | ✻E | ✻data5 |
| ✻data5 | ✻data4 | ✻F | ✻data6 |
| ✻data6 | ✻data5 | ✻G | ✻data0 |

FIG. 4

CURRENT LIST X 32

|   | GUID | DEVICE INFORMATION |
|---|---|---|
| ✳A | a | a (—) |
| ✳B | b | b (—) |
| ✳C | c | c (—) |
| ✳D | d | d (—) |
| ✳E | e | e (—) |
| ✳F | f | f (—) |
| ✳G | g | g (—) |

LIST Y 33

| NO. | PRIORITY | GUID | DEVICE INFORMATION |
|---|---|---|---|
| 1 | 3 | h | h (—) |
| 2 | 2 | i | i (—) |
| 3 | 1 | j | j (—) |
| 4 | 3 | k | k (—) |
| 5 | 3 | l | l (—) |
| 6 | 2 | m | m (—) |

NEW POINTER LIST 40

|  | POINTER TO PREVIOUS RECORD | POINTER TO RECORD IN CURRENT LIST X | POINTER TO NEXT RECORD |  |
|---|---|---|---|---|
| ✻data0 | ✻data6 | ✻A | ✻data1 | ⎫ 48 |
| ✻data1 | ✻data0 | ✻B | ✻data2 | |
| ✻data2 | ✻data1 | ✻D | ✻data3 | |
| ✻data3 | ✻data2 | ✻E | ✻data4 | |
| ✻data4 | ✻data3 | ✻G | ✻data5 | |
| ✻data5 | ✻data4 | ✻H | ✻data6 | ⎫ 49 |
| ✻data6 | ✻data5 | ✻O | ✻data0 | ⎫ 50 |

FIG. 10

NEW LIST X 42

|  | GUID | DEVICE INFORMATION |  |
|---|---|---|---|
| ✻A | a | a(—) | ⎫ 47 |
| ✻B | b | b(—) | |
| ✻D | d | d(—) | |
| ✻E | e | e(—) | |
| ✻G | g | g(—) | |
| ✻H | h | h(—) | ⎫ 43 |
| ✻O | o | o(—) | ⎫ 44 |

FIG. 11

LIST Y 33

| NO. | PRIORITY | GUID | DEVICE INFORMATION |
|---|---|---|---|
| 1 | 2 | i | i (—) |
| 2 | 1 | j | j (—) |
| 3 | 3 | k | k (—) |
| 4 | 3 | l | l (—) |
| 5 | 2 | m | m (—) |

FIG. 12

LIST Y 33

| NO. | PRIORITY | GUID | DEVICE INFORMATION | |
|---|---|---|---|---|
| 1 | 2 | i | i (—) | |
| 2 | 1 | j | j (—) | } 52 |
| 3 | 3 | k | k (—) | |
| 4 | 3 | l | l (—) | |
| 5 | 2 | m | m (—) | |
| 6 | 2 | c | c (—) | } 53 |

FIG. 13

LIST Y 33

| NO. | PRIORITY | GUID | DEVICE INFORMATION | |
|---|---|---|---|---|
| 1 | 2 | i | i (—) | } 54 |
| 2 | 3 | k | k (—) | |
| 3 | 3 | l | l (—) | |
| 4 | 2 | m | m (—) | |
| 5 | 2 | c | c (—) | |
| 6 | 2 | f | f (—) | } 55 |

FIG. 15

LIST Y 33

| NO. | PRIORITY | GUID | DEVICE INFORMATION |
|---|---|---|---|
| 1 | 3 | k | k (—) |
| 2 | 3 | l | l (—) |
| 3 | 2 | m | m (—) |
| 4 | 2 | c | c (—) |
| 5 | 2 | f | f (—) |
| 6 | 2 | g | g (—) |

56

CONTROLLER TO BE CONNECTED TO A NETWORK VIA AN IEEE 1394 SERIAL BUS

BACKGROUND OF THE INVENTION

1. Field of the Invention

The present invention relates to a controller such as a set-top box, a digital television receiver and the like, which is connected to an IEEE 1394 serial bus.

2. Description of the Related Art

A conventional controller connected to an IEEE 1394 serial bus (hereafter referred to simply as "bus") controls target devices, connected to the bus, in accordance with information returned from each target device as a result of an inquiry which the controller makes, by sending an inquiry command, after bus reset occurrence, to each target device to inquire device information of each target device.

However, in the conventional controller as described above, device information needed to control each target device is directly acquired from each target device each time a bus reset is occurred. Accordingly, there is a problem that it takes a long time to acquire device information of all the target devices to be controlled. This problem increases in proportion to the number of target devices for the controller to control.

Meanwhile, Japanese Laid-open Patent Publication 2002-16620 discloses a technology of device connection for devices to be connected to a bus, wherein when there is contention to acquire a channel of bus interface, the channel is switched to a plug with highest priority among plugs in contention. In a technical field of device connection of this kind, furthermore, Japanese Laid-open Patent Publication 2003-18161 discloses a technology to increase the priority of a device associated with a detected event, and to allocate a band by priority to the device with the increased priority. However, none of the technologies disclosed in these patent publications can solve the above-described problem that it takes a long time to acquire device information of all the target devices.

SUMMARY OF THE INVENTION

An object of the present invention is to provide a controller which makes it possible to shorten time needed to acquire device information of all targets to be controlled.

According to a first aspect of the present invention, this object is achieved by a controller to be connected to a network via an IEEE 1394 serial bus, comprising: an IEEE 1394 interface (hereafter referred to as "interface") to send and receive data to and from target devices on the network; a microprocessor to control each target device in accordance with device information of the each target device received by the interface; and a memory to store a past device information list that is a list of records of device information of target devices having been connected to the network in the past, and further to contain a configuration ROM storing information of kind of the controller.

Therein, each record in the past device information list includes information of priority which indicates probability that a target device corresponding to the each record is controlled by the controller, the priority being decided based on the device information of the target device corresponding to the each record and on the information of the kind of the controller stored in the configuration ROM.

Therein, if it becomes necessary to add, to the past device information list, a record of device information of a target device removed from the network to which the target device has been connected, and if number of records in the past device information list is already at its maximum so that it is impossible to store a record in the past device information list any more, then the microprocessor decides the priority of the removed target device, based on device information of the removed target device and on information of the kind of the controller stored in the configuration ROM, in which the priority of the removed target device indicates probability that the removed target device is controlled by the controller, and the microprocessor searches, from records stored in the past device information list, for a record having a priority lower than the priority of the removed target device, one by one in order from the first record in the past device information list, wherein if the microprocessor finds a record having such the lower priority by the search, the microprocessor deletes from the past device information list such the record having been first found, wherein if, on the other hand, the microprocessor fails to find a record having such the lower priority by the search, the microprocessor further searches for a record, which has the same priority as the priority of the removed target device, from the records stored in the past device information list, one by one in order from the first record in the past device information list, and the microprocessor deletes from the past device information list such the record as having been first found by the further search, and wherein after the either deletion of such the record, the microprocessor adds to the past device information list a record of the device information of the removed target device.

According to such the configuration as described, if it becomes necessary to add, to the past device information list, a record of device information of a target device removed from the network to which the target device has been connected, and if number of records in the past device information list is already at its maximum so that it is impossible to store a record in the past device information list any more, then the microprocessor decides the priority of the removed target device (i.e. priority indicating probability that the removed target device is controlled by the controller), based on device information of the removed target device and on information of the kind of the controller stored in the configuration ROM. Then, the microprocessor searches, from records stored in the past device information list, for a record having a priority lower than the priority of the removed target device, one by one in order from the first record in the past device information list.

If the microprocessor finds a record having such the lower priority by the search, the microprocessor deletes from the past device information list such the record having been first found, and thereafter the microprocessor adds to the past device information list a record of the device information of the removed target device. On the other hand, if the microprocessor fails to find a record having such the lower priority by the search, the microprocessor further searches for a record, which has the same priority as the priority of the removed target device, from the records stored in the past device information list, one by one in order from the first record in the past device information list, and the microprocessor deletes from the past device information list such the record as having been first found by the further search, and thereafter the microprocessor adds to the past device information list a record of the device information of the removed target device.

Thereby, device information of a target which is highly probable to be controlled by such the controller can be made to remain in the past device information list. This makes it possible to increase the probability that the microprocessor can control each target on the basis of the device information stored in the past device information list. Accordingly, the frequency to directly acquire device information from each target can be reduced, thereby making it possible to shorten time needed to acquire the device information of all the targets.

Preferably, the priority of each target device is decided based on distance between the each target device and the controller in addition to the device information of the each target device corresponding to the each record in the past device information list and the information of the kind of the controller stored in the configuration ROM.

According to a second aspect of the present invention, the above-described object is achieved by a controller to be connected to a network via an IEEE 1394 serial bus, comprising: an IEEE 1394 interface (hereafter referred to as "interface") to send and receive data to and from target devices on the network; a microprocessor to control each target device in accordance with device information of the each target device received by the interface; and a memory to store a current device information list that is a list of records of device information of target devices currently connected to the network and that is made on the basis of the device information of the each target device received by the interface, and further to store a past device information list that is a list of records of device information of target devices having been connected to the network in the past, and still further to contain a configuration ROM storing information of kind of the controller.

Therein, each record in the past device information list includes information of priority which indicates probability that a target device corresponding to the each record is controlled by the controller, the priority being decided based on the device information of the target device corresponding to the each record and on the information of the kind of the controller stored in the configuration ROM.

Therein, if records having been stored in the current device information list prior to bus reset contain a record including a GUID (Global Unique Identifier) other than GUID received by the interface after the bus reset (such the record being hereafter referred to as "remaining record"), the microprocessor performs a process of adding to the past device information list a record corresponding to the remaining record (such the process being hereafter referred to as "adding process"), wherein if, in the adding process, number of records in the past device information list is already at its maximum so that it is impossible to store a record in the past device information list any more, then the microprocessor decides the priority of a target device corresponding to the remaining record, based on device information included in the remaining record and on information of the kind of the controller stored in the configuration ROM, in which the priority of the target device corresponding to the remaining record indicates probability that such the target device is controlled by the controller (such the priority being hereafter referred to as "priority of the remaining record"), and the microprocessor searches, from records stored in the past device information list, for a record having a priority lower than the priority of the remaining record, one by one in order from the first record in the past device information list, wherein if the microprocessor finds a record having such the lower priority by the search, the microprocessor deletes from the past device information list such the record having been first found, wherein if, on the other hand, the microprocessor fails to find a record having such the lower priority by the search, the microprocessor further searches for a record, which has the same priority as the priority of the remaining record, from the records stored in the past device information list, one by one in order from the first record in the past device information list, and the microprocessor deletes from the past device information list such the record as having been first found by the further search, and wherein after the either deletion of such the record, the microprocessor adds to the past device information list a record of the device information of the target device corresponding to the remaining record.

According to a third aspect of the present invention, the above-described object is achieved by a controller to be connected to a network via an IEEE 1394 serial bus, comprising: an IEEE 1394 interface (hereafter referred to as "interface") to send and receive data to and from target devices on the network; a microprocessor to control each target device in accordance with device information of the each target device received by the interface; and a memory to store a current device information list that is a list of records of device information of target devices currently connected to the network and that is made on the basis of the device information of the each target device received by the interface, and further to store a past device information list that is a list of records of device information of target devices having been connected to the network in the past, and still further to contain a configuration ROM storing information of kind of the controller.

Therein, each record in the past device information list includes information of priority which indicates probability that a target device corresponding to the each record is controlled by the controller, the priority being decided based on distance between the target device corresponding to the each record and the controller in addition to the device information of the target device corresponding to the each record and the information of the kind of the controller stored in the configuration ROM.

Therein, if records having been stored in the current device information list prior to bus reset contain a record including a GUID (Global Unique Identifier) other than GUID received by the interface after the bus reset (such the record being hereafter referred to as "remaining record"), the microprocessor performs a process of adding to the past device information list a record corresponding to the remaining record (such the process being hereafter referred to as "adding process"), wherein if, in the adding process, number of records in the past device information list is already at its maximum so that it is impossible to store a record in the past device information list any more, then the microprocessor decides the priority of a target device corresponding to the remaining record, based on distance between the target device corresponding to the remaining record and the controller in addition to device information included in the remaining record and the information of the kind of the controller stored in the configuration ROM, in which the priority of the target device corresponding to the remaining record indicates probability that such the target device is controlled by the controller (such the priority being hereafter referred to as "priority of the remaining record"), and the microprocessor searches, from records stored in the past device information list, for a record having a priority lower than the priority of the remaining record, one by one in order from the first record in the past device information list, wherein if the microprocessor finds a record having such the lower priority by the search, the microprocessor deletes from the past device information list such the record having been first found, wherein if, on the other hand, the microprocessor fails to find a record having such the lower priority by the search, the microprocessor further searches for a record, which has the same priority as the priority of the remaining record, from the records stored in the past device information list, one by one in order from the first record in the past device information list, and the microprocessor deletes from the past device information list such the record as having been first found by the further search, and wherein after the either deletion of such the record, the microprocessor adds to the past device information list a record of the device information of the target device corresponding to the remaining record.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 4 is a table showing contents of a current list X stored in the controller device;

FIG. 5 is a table showing contents of a list Y stored in the controller device prior to bus reset;

FIG. 9 is a table showing contents of a new pointer list stored in the controller device;

FIG. 10 is a table showing contents of a new list X stored in the controller device;

FIG. 11 is a table showing contents of the list Y shown in FIG. 5 from which a record of GUID="h" has been deleted;

FIG. 12 is a table showing contents of the list Y shown in FIG. 11 to which a record of GUID="c" has been added;

FIG. 13 is a table showing contents of the list Y shown in FIG. 12 from which a record of GUID="j" has been deleted, and to which a record of GUID="f" has been added;

FIG. 15 is a table showing contents of the list Y shown in FIG. 12 from which a record of GUID="i" has been deleted, and to which a record of GUID="g" has been added.

DESCRIPTION OF THE PREFERRED EMBODIMENTS

Embodiments of the present invention, as best mode for carrying out the invention, will be described hereinafter with reference to the drawings. It is to be understood that the embodiments described herein are not intended as limiting or encompassing the entire scope of the invention.

Figure 1:
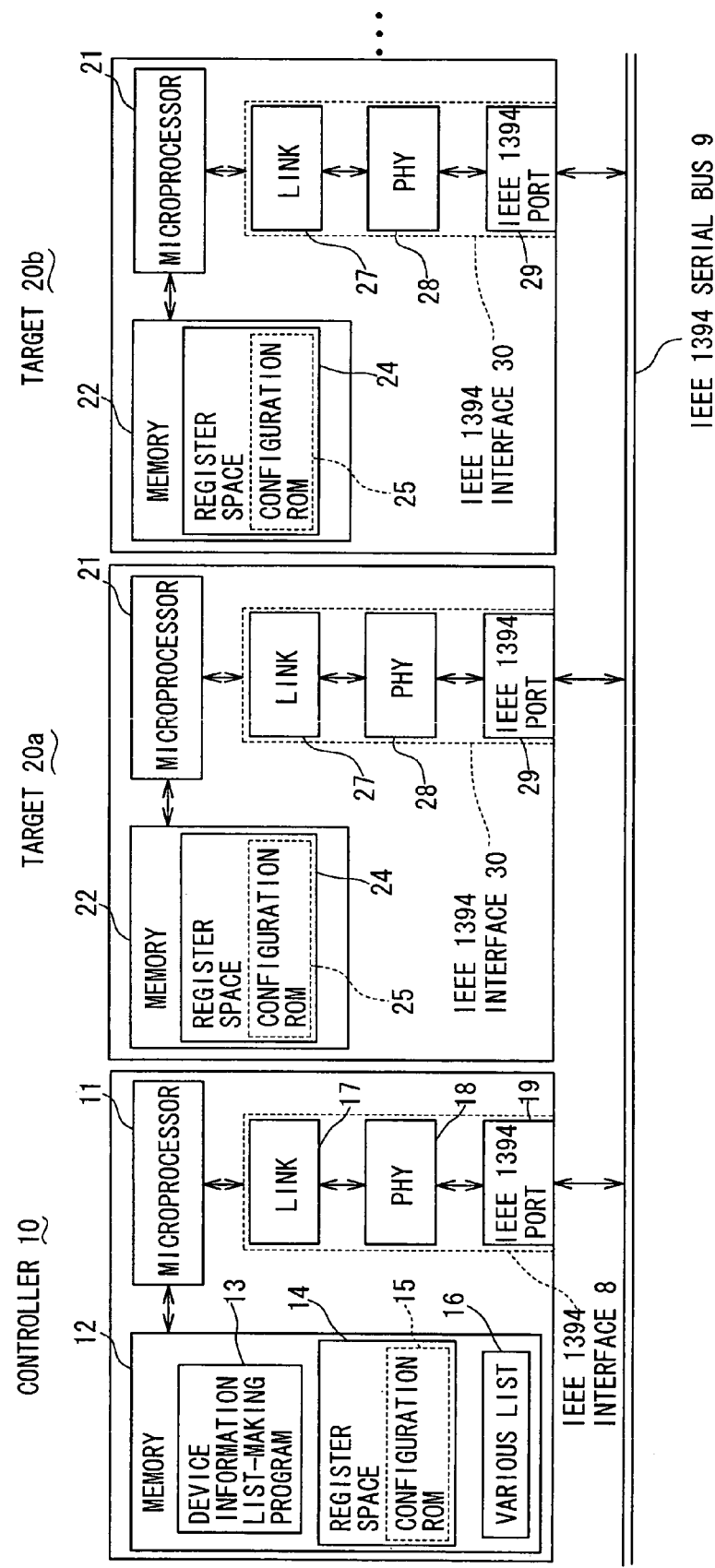
FIG. 1 is a schematic electrical block diagram showing a controller device according to a first embodiment of the present invention as well as target devices to form a home network.

FIG. 1 shows a schematic electrical block diagram of a controller 10 according to a first embodiment of the present invention as well as target devices 20a and 20b to be controlled by this controller 10. The controller 10 is connected via an IEEE 1394 serial bus 9 (hereafter referred to simply as "bus") to the target devices 20a and 20b (hereafter referred to collectively as "target(s) 20") to be controlled. These targets 20 and the controller 10 form a home network 7.

The controller 10 comprises a microprocessor 11 to control the entire system and a memory 12 to store various data. The microprocessor 11 also provides a function of application layer in the IEEE 1394 protocol. The memory 12 stores: a program (device information list-making program) 13 to make a list storing device information of each target 20 that is needed to control each target 20 as well as storing GUID (Global Unique Identifier) that is identification information specific to each target 20; a register space 14 storing various information regarding the controller 10 itself and the other connected devices on the bus 9; various lists 16 made by the above-described device information list-making program 13; and the like. The register space 14 stores a configuration ROM (read-only memory) 15 storing information such as GUID and kind of the controller 10 itself.

The controller 10 further comprises an IEEE 1394 interface (hereafter referred to simply as "interface") 8 to send and receive data to and from each target 20 on the home network 7. This interface 8 comprises: a LINK chip 17 to provide services at link layer level in the IEEE 1394 protocol; a PHY chip 18 to provide services at physical layer level in the IEEE 1394 protocol; and an IEEE 1394 port 19 to connect a cable for the bus 9. Like the controller 10, each of the above-described targets 20 comprises a microprocessor 21, a memory 22 and an interface 30, wherein the memory 22 contains a register space 24. Furthermore, like the interface 8 of the controller 10, the interface 30 comprises a LINK 27, a PHY 28 and an IEEE 1394 port 29. However, in contrast to the controller 10, the memory 22 does not store items such as the device information list-making program 13 and the various lists 16.

Figures 2, 3:
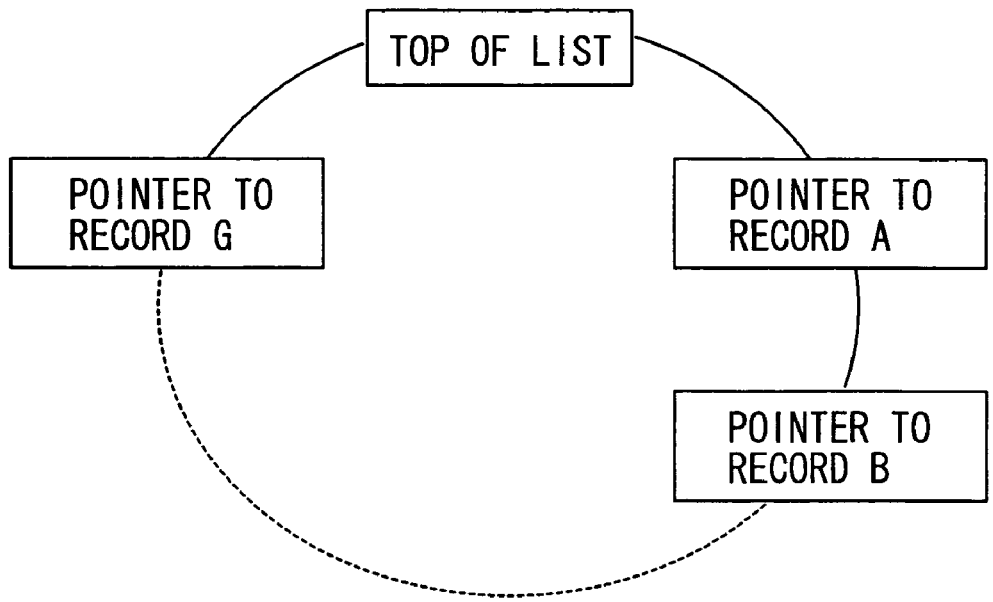
FIG. 2 is a schematic chart showing an image of a current pointer list stored in the controller device.
FIG. 3 is a table showing contents of the current pointer list.

Referring to FIG. 2 to FIG. 5, the various lists 16 stored in the memory 12 of the controller 10 will be described hereinafter. The various lists 16 include: a current pointer list 31 and a current list X 32 (claimed "current device information list") that are lists of device information of targets 20 currently connected to the home network 7 via the bus 9; and a list Y 33 (claimed "past device information list") that is a list of device information of targets 20 having been connected to the home network 7 via the bus 9 in the past. As shown in FIG. 4, the current list X 32 is a list of records A to G actually storing data of device information of the targets 20 which are currently connected to the home network 7 via the bus 9. On the other hand, as shown in FIG. 2 and FIG. 3, the current pointer list 31 is a circular list of records storing pointers *A to *G relating to the records A to G of the current list X 32, respectively.

The list Y 33 as shown in FIG. 5 stores GUIDs and device information, and additionally stores priorities of respective targets 20 corresponding to the respective records. Each of such the priorities is decided by the microprocessor 11 of the controller 10 from the viewpoint of whether the probability that each target 20 is controlled by the controller 10 is high or not, based on the information regarding kind of the controller 10 itself which is stored in the configuration ROM 15 in the controller 10 and on the device information of the target 20.

The higher the priority (The larger the value of priority shown in FIG. 5), the higher is the probability that the target 20 is controlled by the controller 10. For example, in the case where the information regarding kind of the controller 10 itself which is stored in the configuration ROM 15 in the controller 10 shows that the controller 10 is a digital tuner, the device information of the targets 20 connected to the home network 7 shows that the targets 20 consist of a digital television, a hard disc recorder (HD-REC), a digital versatile disc recorder (DVD-REC), a data video home system (D-VHS) and a digital video camera, the microprocessor 11 set the priorities of the targets 20 as below. The microprocessor 11 set the priorities of the digital television, the HD-REC, the DVD-REC, and the D-VHS which is highly probable to be controlled by the digital tuner higher than the priority of the digital video camera whose probability to be controlled by the digital tuner is very low.

Figure 6:
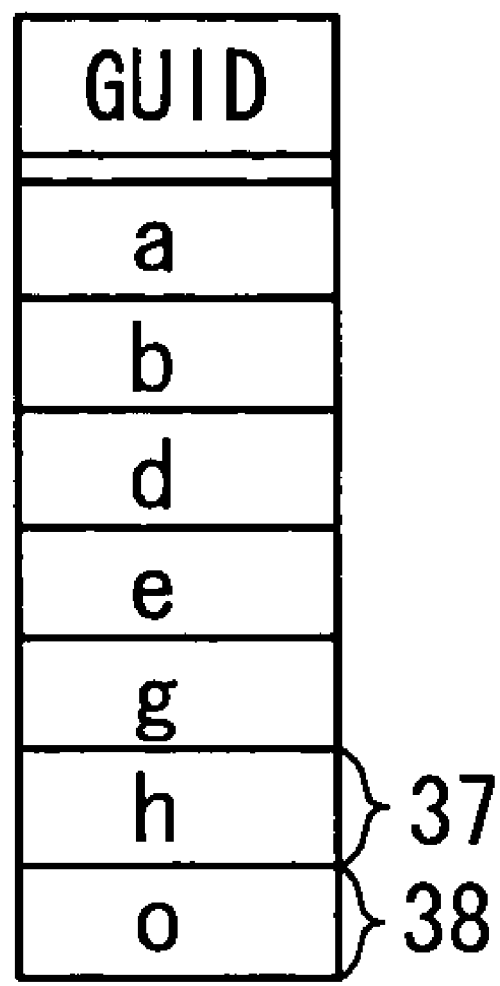
FIG. 6 is a table showing contents of a GUID list stored in the controller device.

If the microprocessor 11 of the controller 10 has not made lists 31 and X 32 even once in the past, the microprocessor 11 sends an inquiry command to all the targets 20 to inquire function of each target 20, and makes lists 31 and X 32 in accordance with information returned from the targets as a result of the inquiry. The memory 12 of the controller 10 holds records of these lists 31 and X 32 even if the power is turned off. When detecting bus reset occurrence, the microprocessor 11 of the controller 10 receives GUID from each target 20 after bus configuration is completed, and the microprocessor 11 makes a GUID list 34 as shown in FIG. 6. If one of GUIDs of records which were stored in the current list X 32 prior to the bus reset occurrence is not contained in the GUID list 34, then the microprocessor 11 stores, in the list Y33, a record that is equivalent to the record in the current list X 32 whose GUID is not contained in the GUID list 34. Even if the power is turned off, the microprocessor 11 and the memory 12 of the controller 10 hold the records in the list Y 33 but do not hold records in the GUID list 34.

In the following, referring to FIG. 3 to FIG. 13, the processes of the controller 10 will be described in the case where a new target 20 is added to the home network 7 via the bus 9, and where a target 20 connected to the home network 7 via the bus 9 is removed therefrom. As shown in the flow chart of FIG. 7, the microprocessor 11 of the controller 10 makes a GUID list 34 as shown in FIG. 6 (S2) when receiving GUID from each target 20 after bus reset is occurred (S1) and bus configuration is completed. Next, the microprocessor 11 of the controller 10 makes a new pointer list 40 (refer to FIG. 9) in the same format as that of the current pointer list 31 prior to the bus reset occurrence as well as a new list X 42 (refer to FIG. 10) in the same format as that of the current list X 32 prior to the bus reset occurrence. It is to be noted that FIG. 9 and FIG. 10 show the new pointer list 40 and the new list X 42 in both of which records have already been stored, and that such the records are not yet stored therein at a stage immediately after the bus reset occurrence.

Below it will be described in detail how the above-described new pointer list 40 and the new list X 42 are made. After the process of the above S2 is completed, the microprocessor 11 of the controller 10 chooses one GUID from the GUID list 34 (S3), and checks (S4) whether or not a record including this chosen GUID exists in the current list X 32 prior to the bus reset occurrence. For example, in the case where GUIDs as shown in FIG. 6 are stored in the GUID list 34, the microprocessor 11 chooses the first GUID (a) therein, and checks whether or not a record including this GUID (a) exists in the records A to G in the current list X 32 as shown in FIG. 4.

If, as in this case, a record including such the GUID (a) exists in the records in the current list X 32 (YES in S4), then the microprocessor 11 of the controller 10: copies such the record A in the current list X 32 as shown by reference numeral 30 in FIG. 4; stores the copied record A in the new list X 42 as shown by reference numeral 47 in FIG. 10 (S5); and furthermore adds, to the new pointer list 40, a record (data0) including a pointer (*A) corresponging to the record A in the new list X 42 as shown by reference numeral 48 in FIG. 9. Thereafter, the microprocessor 11 of the controller 10 deletes from the current list X 32 the corresponding record A as shown by the reference numeral 30 in FIG. 4 (S6). On the other hand, if a record including GUID chosen from the GUID list 34 does not exist in the current list X 32 prior to the bus reset occurrence, the microprocessor 11 performs a process of acquiring device information (S7).

Figure 8:
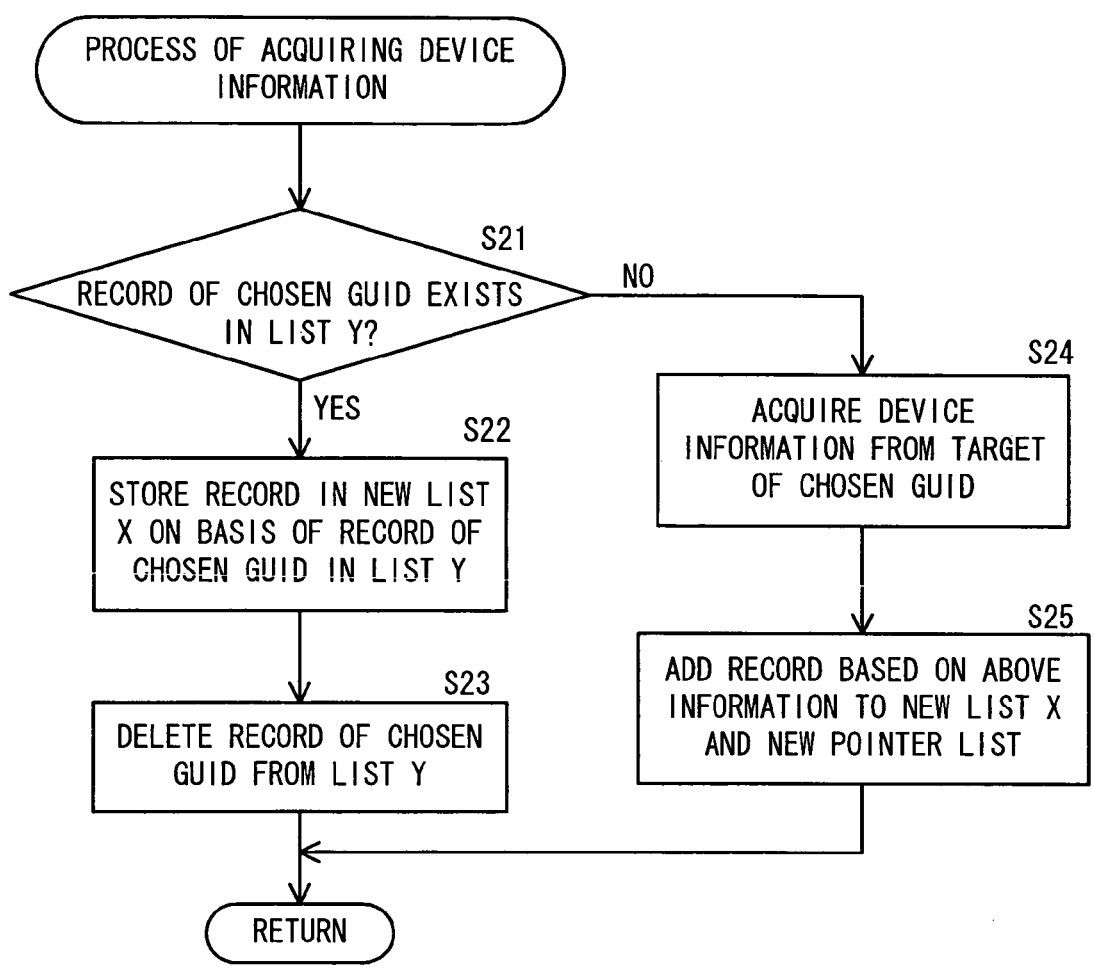
FIG. 8 is a schematic flow chart showing a process of acquiring device information in FIG. 7.

In the following, referring to FIG. 8, the process of acquiring device information will be described. In the current list X 32 as shown in FIG. 4 prior to the bus reset occurrence, no record exists which includes, for example, GUID (h) as shown by reference numeral 37 or GUID (o) as shown by reference numeral 38 in FIG. 6. If the GUID chosen in the above process S3 is such the GUID as non-existing in the current list X 32, the microprocessor 11 of the controller 10 checks (S21) whether or not a record including such the chosen GUID exists in the list Y33 shown in FIG. 5. For example, if the GUID chosen in the above process S3 is "h" as shown by reference numeral 37 in FIG. 6, a record 51 having GUID="h" exists in the list Y 33 as shown in FIG. 5. Accordingly, the microprocessor 11 of the controller 10: stores, in the new list X 42, a record H (refer to reference numeral 43 in FIG. 10) formed on the basis of corresponding record 51 in the list Y 33 (S22); and furthermore adds, to the new pointer list 40, a record (data5) including a pointer (*H) corresponding to the record H in the new list X 42 as shown by reference numeral 49 in FIG. 9. Thereafter, the microprocessor 11 of the controller 10 deletes the corresponding record 51 from the list Y 33 shown in FIG. 5 (S23). Thereby, the data content in the list Y 33 is changed to that as shown in FIG. 11.

If, in the above decision process S21, a record storing such the chosen GUID does not exist in the list Y 33 (NO in S21), then the microprocessor 11 of the controller 10: sends an inquiry command to targets 20 having such the GUID to inquire device information of each of such the targets 20; and adds, to the new list X 42 and the new pointer list 40, records formed on the basis of information acquired from such the targets 20 as a result of the inquiry (S24 and S25). For example, if the GUID chosen in the above process S3 is "o" as shown by reference numeral 38 in FIG. 6, no record having GUID="o" exists in the list Y 33 as shown in FIG. 5. Accordingly, the microprocessor 11 of the controller 10 sends an inquiry command to targets 20 having such the GUID (o) to inquire device information of such the targets 20. In accordance with information acquired from such the targets 20 as a result of the inquiry, the microprocessor 11 of the controller 10 stores: a record O in the new list X 42 as shown by reference numeral 44 in FIG. 10; and furthermore adds, to the new pointer list 40, a record (data6) including a pointer (*O) corresponding to the record O in the new list X 42 as shown by reference numeral 50 in FIG. 9.

After processes for all the GUIDs stored in the GUID list 34 are completed by repeating processes as described above (YES in S8), the microprocessor 11 of the controller 10 checks whether or not, in the current list X 32 as shown in FIG. 4 prior to the bus reset occurrence, there remain record(s) not having been deleted. If it indicates that such the record(s) remain in the current list X 32 (YES in S9), then the microprocessor 11 adds such the remaining record(s) to the list Y 33. For example, if the current list X 32 prior to the bus reset occurrence has such content as shown in FIG. 4, and if the GUID list 34 acquired after the bus reset occurrence has such content as shown in FIG. 6, then resultantly a record C (refer to reference numeral 35 in FIG. 4) and a record F (refer to reference numeral 36 in FIG. 4) that have not been subjected to the processes remain in the current list X 32 after completion of the processes of S1 to S8.

Accordingly, the microprocessor 11 of the controller 10 adds records 53 and 55 having the same contents as those of these records C and F, respectively, to the list Y 33 as shown in FIG. 12 and FIG. 13 (S10), respectively. This process of adding record(s) to the list Y 33 will be described in detail below. After completion of this process of adding records, the microprocessor 11 of the controller 10 deletes the current list X 32 and the current pointer list 31 prior to the bus reset occurrence, and holds the new list X 42 shown in FIG. 10 and the new pointer list 40 shown in FIG. 9 as the current list X 32 and the current pointer list 31, respectively (S11).

Figure 7:
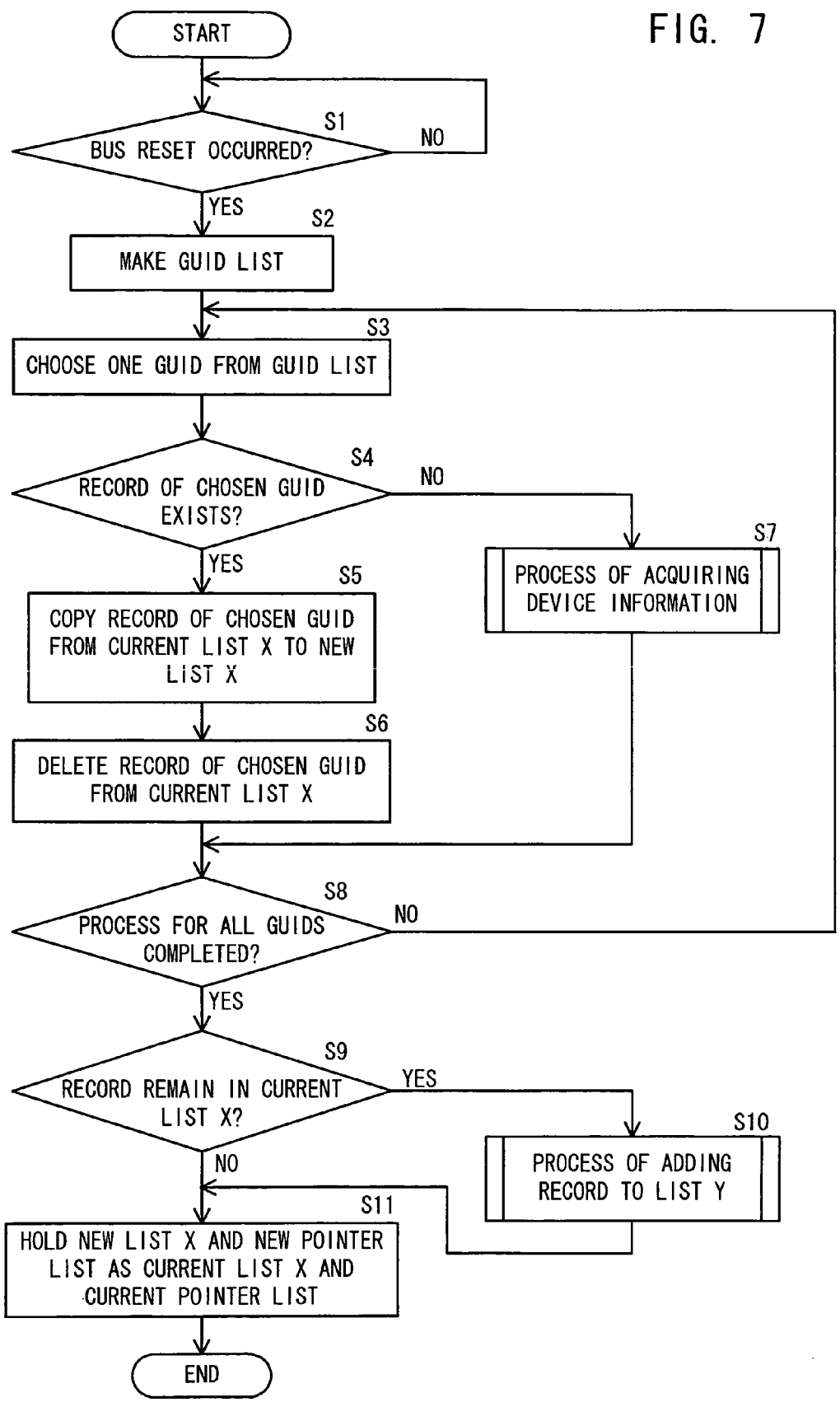
FIG. 7 is a schematic flow chart showing processes of the controller in the case where a new target is added to the bus, and where a target connected to the bus is removed.
Figure 14:
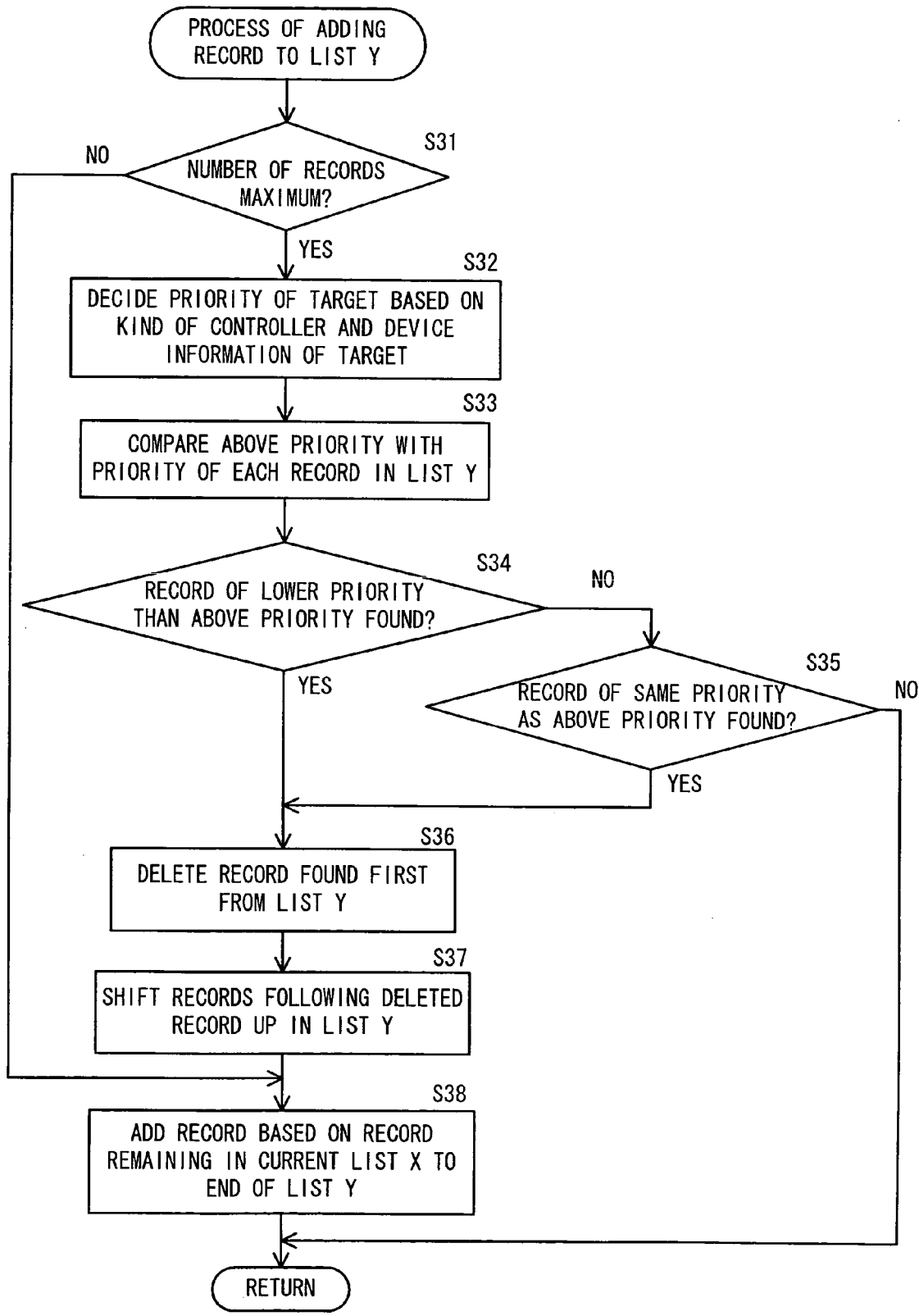
FIG. 14 is a schematic flow chart showing a process of adding a record to the list Y in FIG. 7.

Hereinafter, referring to FIG. 4 to FIG. 13 and FIG. 15 as well as the flow chart of FIG. 14, the process of adding record(s) to the list Y 33 as indicated by S10 in FIG. 7 will be described in detail. For performing the process of adding record(s) to the list Y 33, the microprocessor 11 of the controller 10 checks whether or not the number of records in the list Y 33 is at its maximum (S31). If the number of records in the list Y 33 is not at its maximum (NO in S31) so that it is possible to additionally store a record in the list Y 33, it is not necessary to delete existing record(s) in the list Y 33. Thus, to the end of the list Y 33, the microprocessor 11 of the controller 10 adds record(s), formed on the basis of the record(s) remaining in the current list X 32 (S38), without performing any additional process. For example, if the maximum number of records storable in the list Y 33 is 6, and if the list Y 33 stores records as shown in FIG. 11, then the microprocessor 11 of the controller 10 adds a record 53 to the end of the list Y 33 as shown in FIG. 12 without performing any additional process, wherein the record 53 has been formed on the basis of the record C remaining in the current list X 32.

On the other hand, if the number of records in the list Y 33 is already at its maximum (YES in S31) so that it is impossible to store a record in the list Y 33 any more, it becomes necessary to delete an existing record in the list Y 33. In this case, based on the information regarding the kind of the controller 10 itself as stored in the configuration ROM 15 in the controller 10 and on the device information of the target 20 as included in the remaining record in the current list X 32 on the basis of which the record to be added is formed, the microprocessor 11 of the controller 10 first decides the priority of the target 20 corresponding to the record to be added (S32).

The microprocessor 11 of the controller 10 compares the priority of the target 20 corresponding to the record to be added with the priority of each of the records in the list Y 33, one by one in order from the first record in the list Y 33 (S33), whereby the microprocessor 11 searches, in the list Y 33, for a record having a priority lower than the priority of the target 20 corresponding to the record to be added. If the microprocessor 11 thereby finds a record having such the lower priority (YES in S34), the microprocessor 11 deletes from the list Y 33 such the record having been first found thereby (S36), and shifts the records following the deleted record up by one row in the list Y 33 so that the remaining records in the list Y 33 are arranged continuously from the first to the end of the records (S37). Thereafter, to the end of the list Y 33, the microprocessor 11 of the controller 10 adds a record formed on the basis of the record remaining in the current list X 32 (S38).

For example, if the list Y 33 stores records as shown in FIG. 12, and if a record formed on the basis of the record F (refer to reference numeral 36 in FIG. 4) remaining in the current list X 32 has a priority of 2, then the microprocessor 11 compares this priority (2) with the priority of each of the records in the list Y 33, one by one in order from the first record in the list Y 33, whereby the microprocessor 11 finds a record 52 (refer to FIG. 12) as a first found record having a priority lower than the priority (2) of the record 55 having been formed on the basis of the record F. The microprocessor 11 then deletes the thus first found record 52 from the list Y 33, and shifts the records following the deleted record 52 up by one row in the list Y 33 so that the remaining records in the list Y 33 are arranged continuously from the first to the end of the records as shown in FIG. 13. Thereafter, to the end of the list Y 33, the microprocessor 11 adds the record 55 having been formed on the basis of the record F.

On the other hand, if the microprocessor 11 of the controller 10 fails to find a record having a priority lower than the priority of the target 20 corresponding to the record to be added (NO in S34), then the microprocessor 11 searches for a record, which has the same priority as the priority of the target 20 corresponding to the record to be added, from the records in the list Y 33 one by one in order from the first record in the list Y 33 (S35). If the microprocessor 11 thereby finds a record having such the same priority (YES in S35), the microprocessor 11 deletes from the list Y 33 such the record having been first found thereby (S36), and shifts the records following the deleted record up by one row in the list Y 33 so that the remaining records in the list Y 33 are arranged continuously from the first to the end of the records (S37). Thereafter, to the end of the list Y 33, the microprocessor 11 of the controller 10 adds a record formed on the basis of the record remaining in the current list X 32 (S38).

For example, if the list Y 33 stores records as shown in FIG. 13, and if a target 20 having GUID="g" and having been connected to the home network 7 is removed therefrom, the microprocessor 11 of the controller 10 cannot find, in the list Y 33, a record having a priority lower than the priority of a record 56, which has been formed on the basis of the record G in FIG. 4, because the priority of the record 56 is 2 as shown in FIG. 15. In this case, the microprocessor 11 of the controller 10 searches for a record, which has the same priority as the priority (2) of the record 56, from the records in the list Y 33 one by one in order from the first record in the list Y 33. The microprocessor 11 then deletes from the list Y 33 such the record having been first found by the search, and shifts the records following the deleted record up by one row in the list Y 33 so that the remaining records in the list Y 33 are arranged continuously from the first to the end of the records. Thereafter, to the end of the list Y 33, the microprocessor 11 of the controller 10 adds the record 56 having been formed on the basis of the record G.

On the other hand, if the microprocessor 11 of the controller 10 cannot find a record having such the same priority (NO in S35), then the microprocessor 11 does not add a record to the list Y 33.

As described in the foregoing, in the case where it is impossible to add a record to the list Y 33, the microprocessor 11 of the controller 10 according to the first embodiment of the present invention performs a process as follows. That is, based on the device information of a target 20 as included in a remaining record in the current list X 32 on the basis of which the record to be added is formed, and on the information of the kind of the controller 10 as stored in the configuration ROM 15 in the controller 10, the microprocessor 11 of the controller 10 decides the priority of such the target 20 from the viewpoint of whether the probability that such the target 20 is controlled by the controller 10 is high or not. Thereafter, from the records stored in the list Y 33, the microprocessor 11 deletes a record having a priority lower than the priority of such the target 20. On the other hand, if the microprocessor 11 of the controller 10 cannot find, in the list Y 33, a record having a priority lower than the priority of such the target 20, then the microprocessor 11 deletes the oldest record from the records that are stored in the list Y 33 and that have the same priority as the priority of such the target 20, wherein the oldest is in terms of the time when the record was stored in the list Y 33.

Thus, in the list Y 33, such the record(s) can be made to remain that includes device information of target(s) 20 which is highly probable to be controlled by the microprocessor 11 of the controller 10. This makes it possible to increase the probability that the microprocessor 11 of the controller 10 can control each target 20 on the basis of the device information stored in the current list X 32 and the list Y 33. Accordingly, it becomes possible to reduce the frequency that the microprocessor 11 of the controller 10 is to directly acquire device information from each target 20, thereby making it possible to shorten time needed for the microprocessor 11 of the controller 10 to acquire the device information of all the targets 20.

Next, referring to FIG. 16, a controller 10 according to a second embodiment of the present invention will be described. A digital tuner 60 shown in FIG. 16 corresponds to the controller 10 according to the second embodiment. According to the first embodiment of the present invention, based on information of the kind of the controller 10 and on device information included in a record on the basis of which a record to be added is formed, the priority of the target 20 corresponding to the record to be added is decided. In contrast, according to the second embodiment, the priority of a target 20 corresponding to a record to be added is decided based on distance between such the target 20 and the controller 10 in addition to information of the kind of the controller 10 and device information of such the target 20 included in a record on the basis of which a record to be added is formed.

Figure 16:
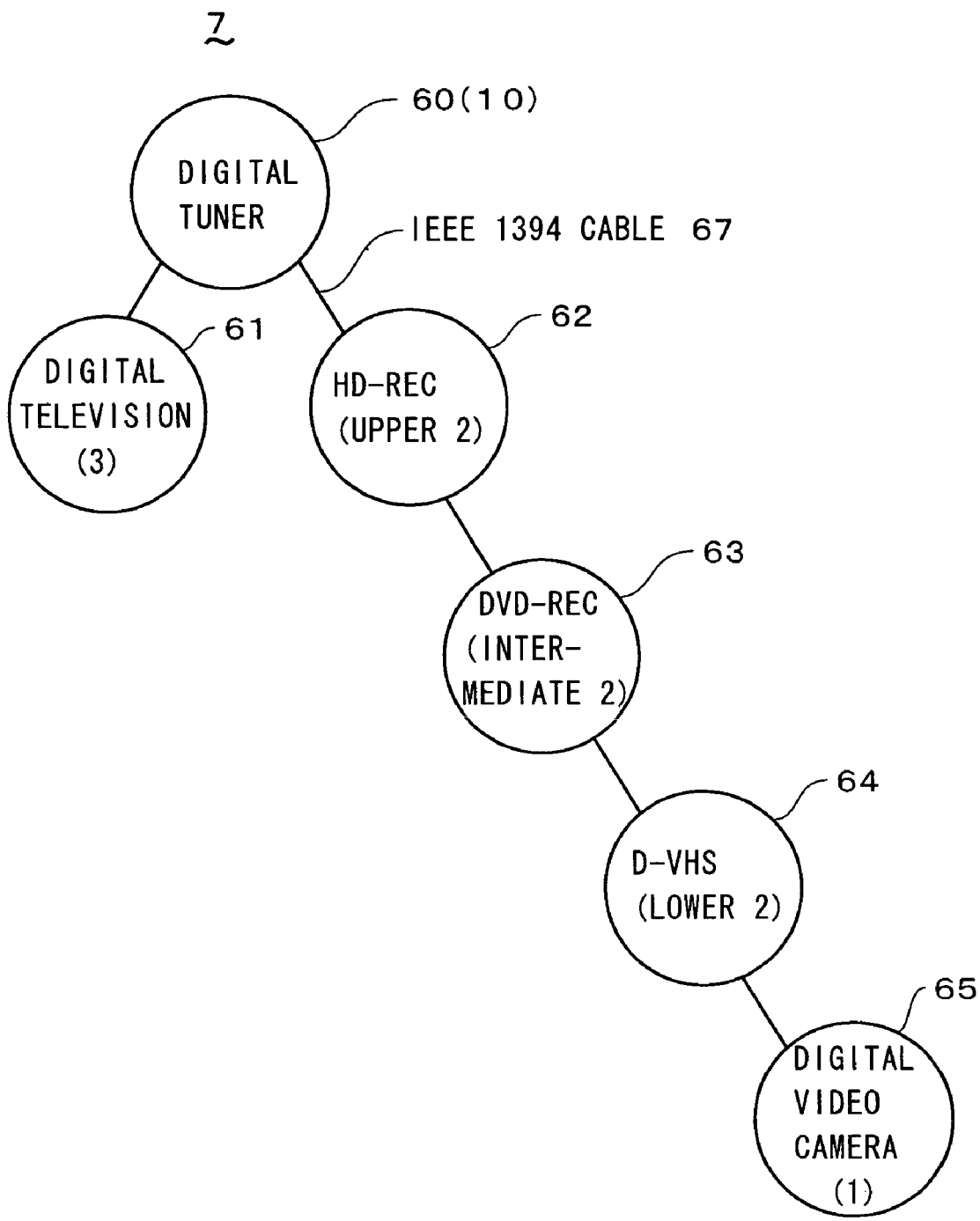
FIG. 16 is a schematic chart showing priority of each target as well as distance between each target and a controller device according to a second embodiment of the present invention.

As shown in FIG. 16, the digital tuner 60 is connected via an IEEE 1394 cable 67 (hereafter referred to simply as "cable") to a digital television 61, a hard disc recorder (HD-REC) 62, a digital versatile disc recorder (DVD-REC) 63, a data video home system (D-VHS) 64 and a digital video camera 65. These digital devices 61 to 65 are targets 20 as seen from the digital tuner 60 as the controller 10. The digital devices 61 to 65 and the digital tuner 60 form a home network 7.

As shown by parenthesized references in each of the digital devices 61 to 65 in FIG. 16, the priorities of the digital television 61, HD-REC 62, DVD-REC 63, D-VHS 64 and digital video camera 65 are 3, intermediate 2, lower 2 and 1, respectively. Among these digital devices, each of the three devices HD-REC 62, DVD-REC 63 and D-VHS 64 has a priority of 2 as decided based on information regarding the kind of the controller 10 and device information included in a record on the basis of which a record to be added is formed. However, the probability that each of HD-REC 62, DVD-REC 63 and D-VHS 64, as targets 20, is to be controlled by the digital tuner 60 is considered to increase as the distance between the digital tuner 60, as the controller 10, and each of such the targets becomes shorter. This is why, as described above, the priorities of HD-REC 62, DVD-REC 63 and D-VHS 64 are so set as to be higher as the distance between the digital tuner 60 and each of these digital devices becomes shorter.

It is to be noted that the present invention is not limited to the above-described aspects and embodiments, and various modifications are possible. For example, for adding a record to the list Y in the above-described first embodiment of the present invention, the record is added to the end of the list Y. However, it is possible to add such the record to the top of the list Y. It is also possible to add such the record to the position in the list Y where the deleted record existed. Furthermore, in the above-described second embodiment of the present invention, the "distance" as a reference for deciding the priority of each digital device can be a sum length of the cable or a total number of relays from the controller to the each digital device.

The present invention has been described above using presently preferred embodiments, but such the description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2003-317346 filed in Japan dated Sep. 9, 2003, the contents of which are hereby incorporated by reference.

What is claimed is:

1. A controller to be connected to a network via an IEEE 1394 serial bus, comprising:

an IEEE 1394 interface (hereafter referred to as "interface") to send and receive data to and from target devices on the network;

a microprocessor to control each target device in accordance with device information of the each target device received by the interface; and a memory to store a past device information list that is a list of records of device information of target devices having been connected to the network in the past, and further to contain a configuration ROM storing information of kind of the controller, wherein each record in the past device information list includes information of priority which indicates probability that a target device corresponding to the each record is controlled by the controller, the priority being decided based on the device information of the target device corresponding to the each record and on the information of the kind of the controller stored in the configuration ROM, and wherein if it becomes necessary to add, to the past device information list, a record of device information of a target device removed from the network to which the target device has been connected, and if number of records in the past device information list is already at its maximum so that it is impossible to store a record in the past device information list any more, then the microprocessor decides the priority of the removed target device, based on device information of the removed target device and on information of the kind of the controller stored in the configuration ROM, in which the priority of the removed target device indicates probability that the removed target device is controlled by the controller, and the microprocessor searches, from records stored in the past device information list, for a record having a priority lower than the priority of the removed target device, one by one in order from the first record in the past device information list, wherein if the microprocessor finds a record having such the lower priority by the search, the microprocessor deletes from the past device information list such the record having been first found, wherein if, on the other hand, the microprocessor fails to find a record having such the lower priority by the search, the microprocessor further searches for a record, which has the same priority as the priority of the removed target device, from the records stored in the past device information list, one by one in order from the first record in the past device information list, and the microprocessor deletes from the past device information list such the record as having been first found by the further search, and wherein after the either deletion of such the record, the microprocessor adds to the past device information list a record of the device information of the removed target device.

2. The controller according to claim 1, wherein the priority of each target device is decided based on distance between the each target device and the controller in addition to the device information of the each target device corresponding to the each record in the past device information list and the information of the kind of the controller stored in the configuration ROM.

3. A controller to be connected to a network via an IEEE 1394 serial bus, comprising:

an IEEE 1394 interface (hereafter referred to as "interface") to send and receive data to and from target devices on the network;

a microprocessor to control each target device in accordance with device information of the each target device received by the interface; and a memory to store a current device information list that is a list of records of device information of target devices currently connected to the network and that is made on the basis of the device information of the each target device received by the interface, and further to store a past device information list that is a list of records of device information of target devices having been connected to the network in the past, and still further to contain a configuration ROM storing information of kind of the controller, wherein each record in the past device information list includes information of priority which indicates probability that a target device corresponding to the each record is controlled by the controller, the priority being decided based on the device information of the target device corresponding to the each record and on the information of the kind of the controller stored in the configuration ROM, wherein if records having been stored in the current device information list prior to bus reset contain a record including a GUID (Global Unique Identifier) other than GUID received by the interface after the bus reset (such the record being hereafter referred to as "remaining record"), the microprocessor performs a process of adding to the past device information list a record corresponding to the remaining record (such the process being hereafter referred to as "adding process"), wherein if, in the adding process, number of records in the past device information list is already at its maximum so that it is impossible to store a record in the past device information list any more, then the microprocessor decides the priority of a target device corresponding to the remaining record, based on device information included in the remaining record and on information of the kind of the controller stored in the configuration ROM, in which the priority of the target device corresponding to the remaining record indicates probability that such the target device is controlled by the controller (such the priority being hereafter referred to as "priority of the remaining record"), and the microprocessor searches, from records stored in the past device information list, for a record having a priority lower than the priority of the remaining record, one by one in order from the first record in the past device information list, wherein if the microprocessor finds a record having such the lower priority by the search, the microprocessor deletes from the past device information list such the record having been first found, wherein if, on the other hand, the microprocessor fails to find a record having such the lower priority by the search, the microprocessor further searches for a record, which has the same priority as the priority of the remaining record, from the records stored in the past device information list, one by one in order from the first record in the past device information list, and the microprocessor deletes from the past device information list such the record as having been first found by the further search, and wherein after the either deletion of such the record, the microprocessor adds to the past device information list a record of the device information of the target device corresponding to the remaining record.

4. A controller to be connected to a network via an IEEE 1394 serial bus, comprising:

an IEEE 1394 interface (hereafter referred to as "interface") to send and receive data to and from target devices on the network;

a microprocessor to control each target device in accordance with device information of the each target device received by the interface; and a memory to store a current device information list that is a list of records of device information of target devices currently connected to the network and that is made on the basis of the device information of the each target device received by the interface, and further to store a past device information list that is a list of records of device information of target devices having been connected to the network in the past, and still further to contain a configuration ROM storing information of kind of the controller, wherein each record in the past device information list includes information of priority which indicates probability that a target device corresponding to the each record is controlled by the controller, the priority being decided based on distance between the target device corresponding to the each record and the controller in addition to the device information of the target device corresponding to the each record and the information of the kind of the controller stored in the configuration ROM, wherein if records having been stored in the current device information list prior to bus reset contain a record including a GUID (Global Unique Identifier) other than GUID received by the interface after the bus reset (such the record being hereafter referred to as "remaining record"), the microprocessor performs a process of adding to the past device information list a record corresponding to the remaining record (such the process being hereafter referred to as "adding process"), wherein if, in the adding process, number of records in the past device information list is already at its maximum so that it is impossible to store a record in the past device information list any more, then the microprocessor decides the priority of a target device corresponding to the remaining record, based on distance between the target device corresponding to the remaining record and the controller in addition to device information included in the remaining record and the information of the kind of the controller stored in the configuration ROM, in which the priority of the target device corresponding to the remaining record indicates probability that such the target device is controlled by the controller (such the priority being hereafter referred to as "priority of the remaining record"), and the microprocessor searches, from records stored in the past device information list, for a record having a priority lower than the priority of the remaining record, one by one in order from the first record in the past device information list, wherein if the microprocessor finds a record having such the lower priority by the search, the microprocessor deletes from the past device information list such the record having been first found, wherein if, on the other hand, the microprocessor fails to find a record having such the lower priority by the search, the microprocessor further searches for a record, which has the same priority as the priority of the remaining record, from the records stored in the past device information list, one by one in order from the first record in the past device information list, and the microprocessor deletes from the past device information list such the record as having been first found by the further search, and wherein after the either deletion of such the record, the microprocessor adds to the past device information list a record of the device information of the target device corresponding to the remaining record.

* * * * *